US012747068B2

(12) United States Patent
Ritondo

(10) Patent No.: US 12,747,068 B2
(45) Date of Patent: Sep. 29, 2026

(54) METHOD AND MACHINE FOR MANUFACTURING A FLEXIBLE ENVELOPE-LIKE BAG, PARTICULARLY WITH REINFORCEMENT

(71) Applicant: HOLWEG GROUP, Molsheim (FR)

(72) Inventor: Cédric Ritondo, Molsheim (FR)

(73) Assignee: Holweg Group, Molsheim (FR)

( * ) Notice: Subject to any disclaimer, the term of this patent is extended or adjusted under 35 U.S.C. 154(b) by 154 days.

(21) Appl. No.: 18/560,256

(22) PCT Filed: May 9, 2022

(86) PCT No.: PCT/EP2022/062444
§ 371 (c)(1),
(2) Date: Nov. 10, 2023

(87) PCT Pub. No.: WO2022/238305
PCT Pub. Date: Nov. 17, 2022

(65) Prior Publication Data

US 2024/0239556 A1 Jul. 18, 2024

(30) Foreign Application Priority Data

May 12, 2021 (FR) ....................................... 2105064

(51) Int. Cl.
*B31B 70/81* (2017.01)
*B31B 70/00* (2017.01)
(Continued)

(52) U.S. Cl.
CPC ............ *B65D 27/02* (2013.01); *B31B 70/008* (2017.08); *B31B 70/10* (2017.08); *B31B 70/16* (2017.08);
(Continued)

(58) Field of Classification Search
CPC ..... B31B 70/10; B31B 70/813; B31B 70/146; B31B 70/16; B31B 70/8123; B31B 70/62;
(Continued)

(56) References Cited

U.S. PATENT DOCUMENTS

| | | | |
|---|---|---|---|
| 687,679 | A | 11/1901 | Eisenbeis |
| 775,268 | A | 11/1904 | Flowers |

(Continued)

FOREIGN PATENT DOCUMENTS

| | | | |
|---|---|---|---|
| DE | 951899 | C | 11/1956 |
| EP | 0605931 | A1 | 7/1994 |

(Continued)

OTHER PUBLICATIONS

International Search Report and Written Opinion of International Application No. PCT/EP2022/062444 dated Aug. 25, 2022, 14 pages (English Translation of International Search Report included).

(Continued)

*Primary Examiner* — Thomas M Wittenschlaeger
(74) *Attorney, Agent, or Firm* — Andrus Intellectual Property Law, LLP

(57) ABSTRACT

A method for manufacturing flexible bags, including: a first strip of flexible material is unwound as a continuous sheet in a longitudinal direction; a hem is formed on each edge of the first strip and the hems are glued over at least one length of a first or a second flap on one stitching face; a fold is formed in the first strip along a transverse folding line to fold down the first flap over the second flap against an internal face of the first strip, the fold bringing, for each edge, hem against hem so as to obtain the bonding of the hems, the strip is cut along a transverse section to form the bag at the end of the operations. Machine implementing the method and bag thus obtained.

13 Claims, 11 Drawing Sheets

(51) Int. Cl.

| | |
|---|---|
| ***B31B 70/10*** | (2017.01) |
| ***B31B 70/16*** | (2017.01) |
| ***B31B 70/26*** | (2017.01) |
| ***B31B 70/62*** | (2017.01) |
| ***B31B 70/98*** | (2017.01) |
| ***B65D 27/02*** | (2006.01) |
| ***B65D 27/14*** | (2006.01) |
| ***B65D 81/03*** | (2006.01) |
| ***B65D 81/38*** | (2006.01) |
| *B31B 70/14* | (2017.01) |
| *B31B 155/00* | (2017.01) |
| *B31B 160/20* | (2017.01) |
| *B31B 170/20* | (2017.01) |

(52) U.S. Cl.
CPC .......... *B31B 70/261* (2017.08); *B31B 70/266* (2017.08); *B31B 70/62* (2017.08); *B31B 70/8122* (2017.08); *B31B 70/98* (2017.08); *B65D 27/14* (2013.01); *B65D 81/03* (2013.01); *B65D 81/3897* (2013.01); *B31B 70/005* (2017.08); *B31B 70/146* (2017.08); *B31B 2155/002* (2017.08); *B31B 2160/20* (2017.08); *B31B 2170/20* (2017.08)

(58) Field of Classification Search
CPC . B31B 70/98; B31B 2155/00; B31B 2160/20; B65D 33/18; B65D 27/14; B65D 27/34; B65D 27/06; B65D 27/38; B65D 31/10
See application file for complete search history.

(56) References Cited

U.S. PATENT DOCUMENTS

| | | | | | |
|---|---|---|---|---|---|
| 2,162,258 | A * | 6/1939 | Hultin | B65D 31/005 | 383/122 |
| 2,237,327 | A | 4/1941 | Bell | | |
| 2,245,675 | A * | 6/1941 | Hultin | B31B 70/00 | 383/122 |
| 2,730,934 | A * | 1/1956 | Van Der Meulen | B31B 70/00 | 493/251 |
| 2,961,063 | A * | 11/1960 | Fesco | A47L 9/14 | 383/122 |
| 3,051,103 | A * | 8/1962 | Williams | B31B 70/008 | 112/475.08 |
| 3,358,903 | A | 12/1967 | De Stefano | | |
| 3,438,310 | A * | 4/1969 | Woodruff | B31B 70/146 | 83/73 |
| 3,596,443 | A * | 8/1971 | Goldberg | A47L 9/14 | 383/122 |
| 3,596,573 | A * | 8/1971 | Shrum | B65D 31/10 | 493/194 |
| 4,761,080 | A * | 8/1988 | Schirmer | B65D 31/02 | 383/114 |
| 4,881,933 | A * | 11/1989 | Wech | B31B 70/8134 | 493/197 |
| 5,006,186 | A | 4/1991 | Yokoyama | | |
| 5,165,799 | A | 11/1992 | Wood | | |
| 6,059,912 | A | 5/2000 | Kellogg | | |
| 6,461,041 | B1 | 10/2002 | Simhaee | | |
| 2020/0009818 | A1 | 1/2020 | Walsh | | |
| 2024/0239558 | A1 | 7/2024 | Ritondo | | |

FOREIGN PATENT DOCUMENTS

| | | | |
|---|---|---|---|
| EP | 2864114 | A1 | 4/2015 |
| EP | 3564146 | A1 | 11/2019 |
| FR | 786579 | A | 9/1935 |
| FR | 1120408 | A | 7/1956 |
| FR | 1270400 | A | 8/1961 |
| FR | 2054249 | A5 | 4/1971 |
| WO | 8301430 | A1 | 4/1983 |
| WO | 8605442 | A1 | 9/1986 |
| WO | 2016097310 | A1 | 6/2016 |
| WO | 2020049376 | A1 | 3/2020 |
| WO | 2020120616 | A1 | 6/2020 |
| WO | 2022238301 | A1 | 11/2022 |

OTHER PUBLICATIONS

International Search Report and Written Opinion of International Patent Application No. PCT/EP2022/062438 mailed Sep. 5, 2022.

* cited by examiner

[Fig. 1]
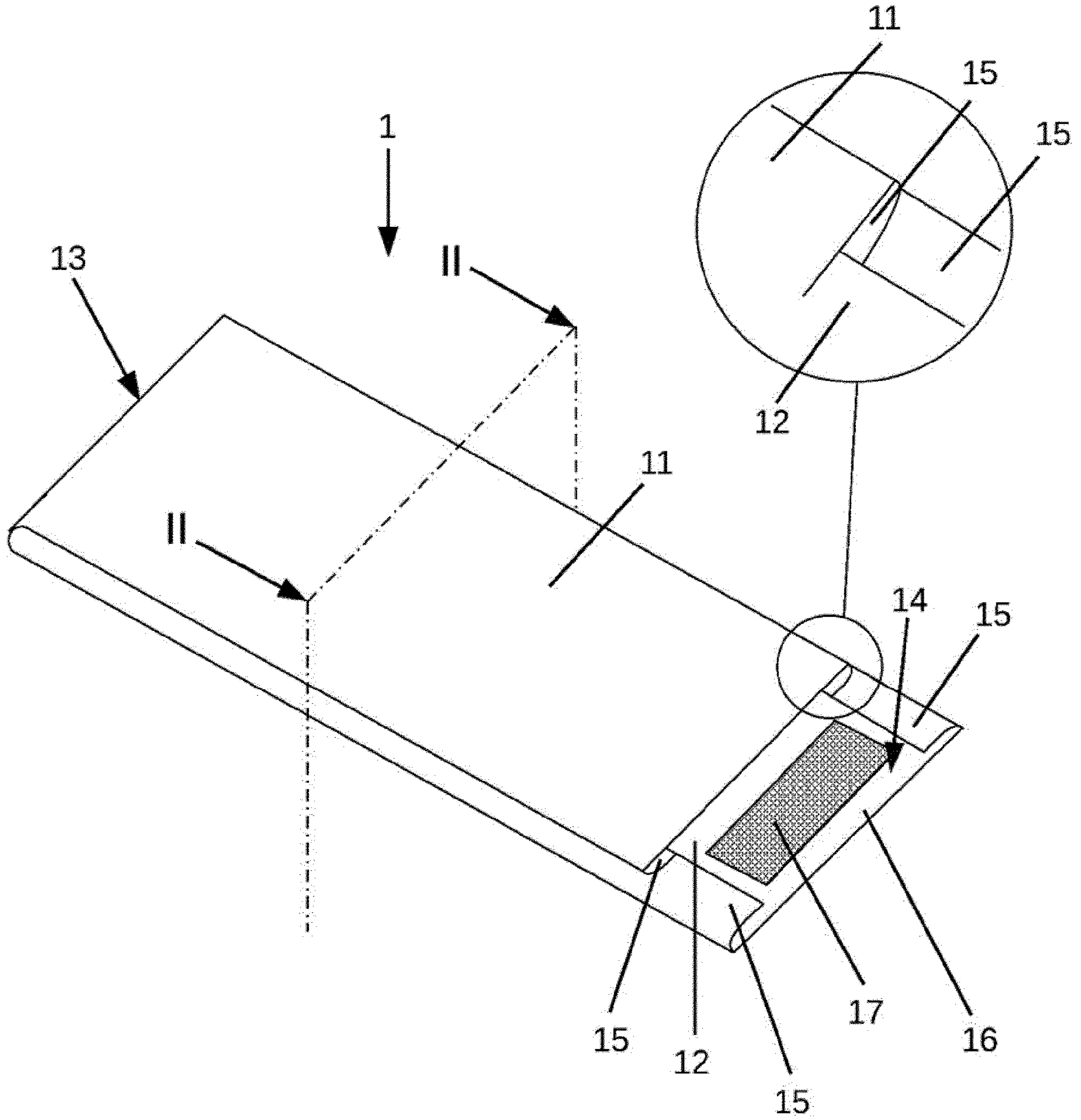

[Fig. 2]
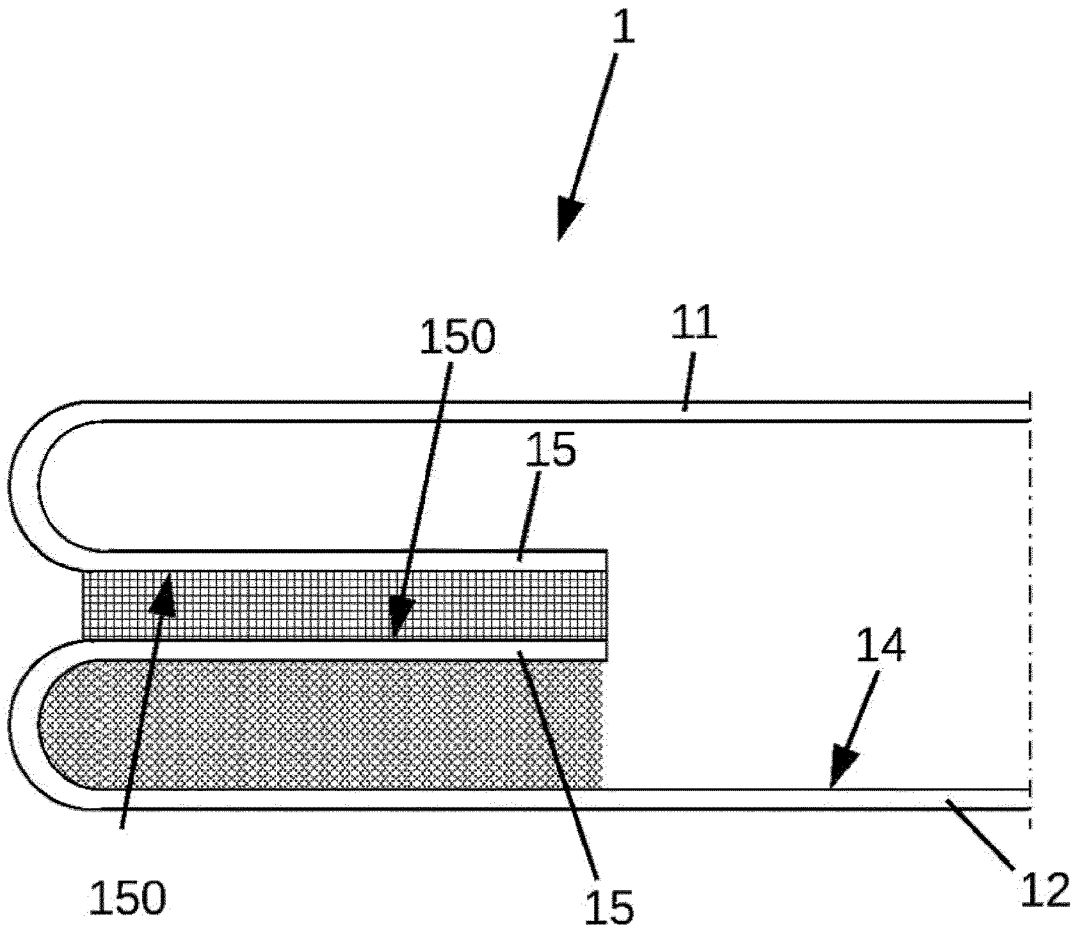
[Fig. 3]
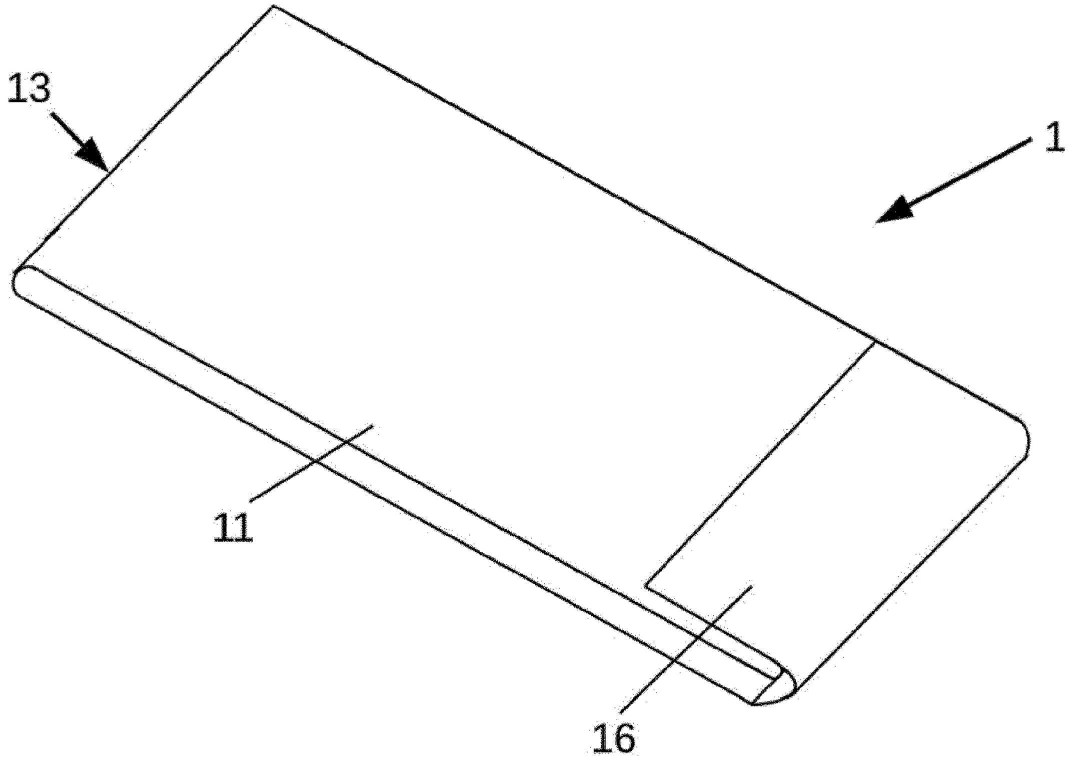

[Fig. 4]
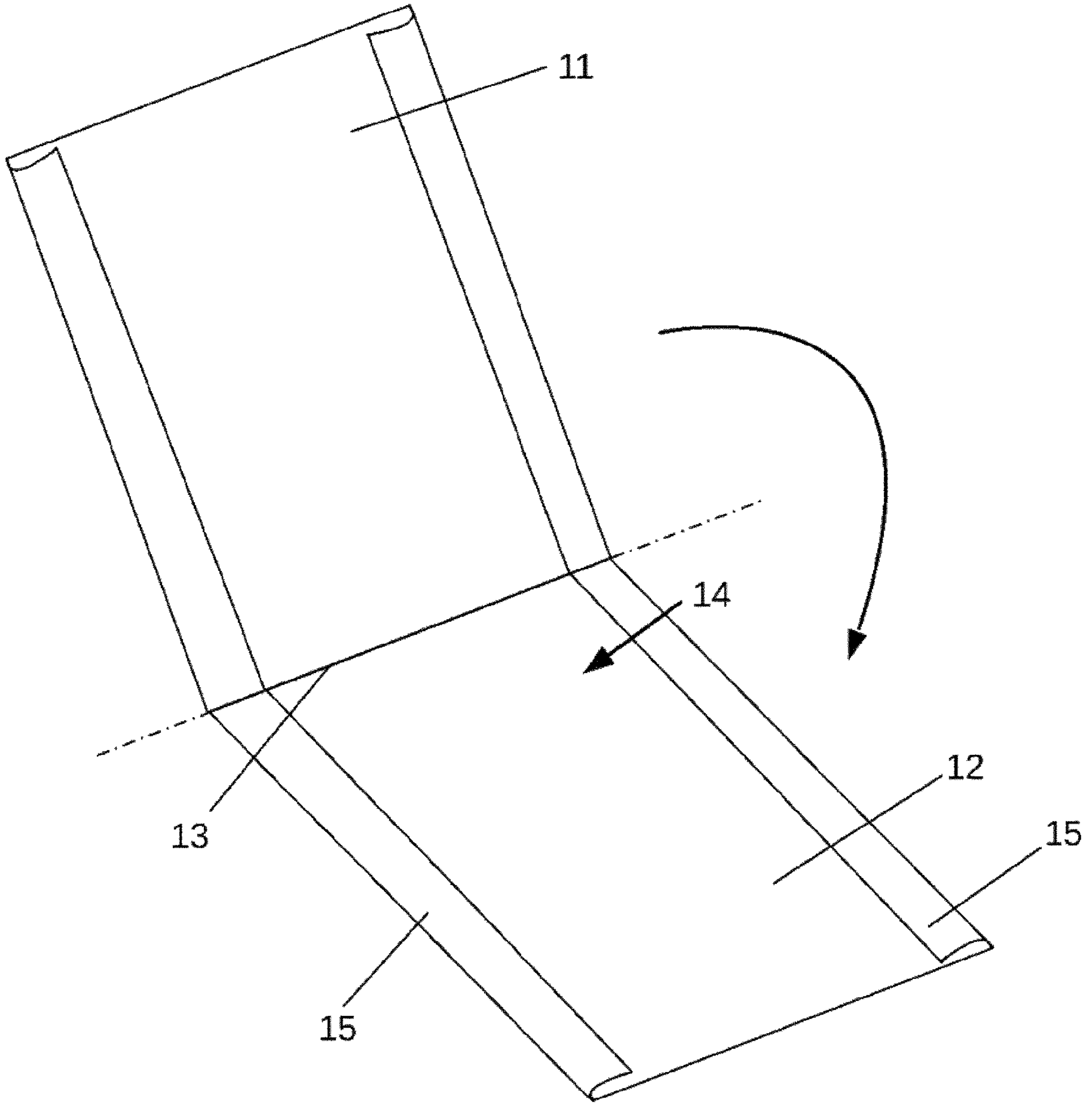

[Fig. 5]
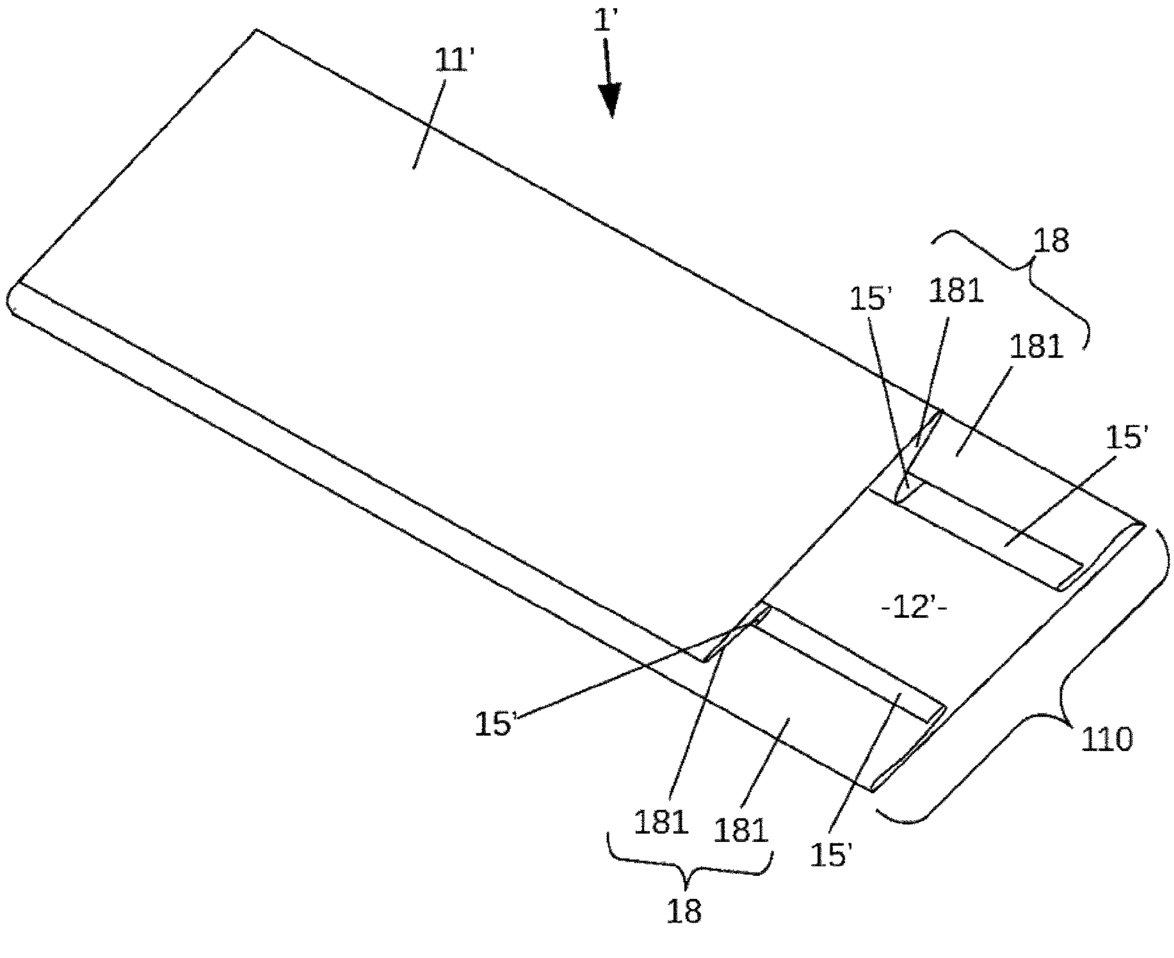

[Fig. 6]
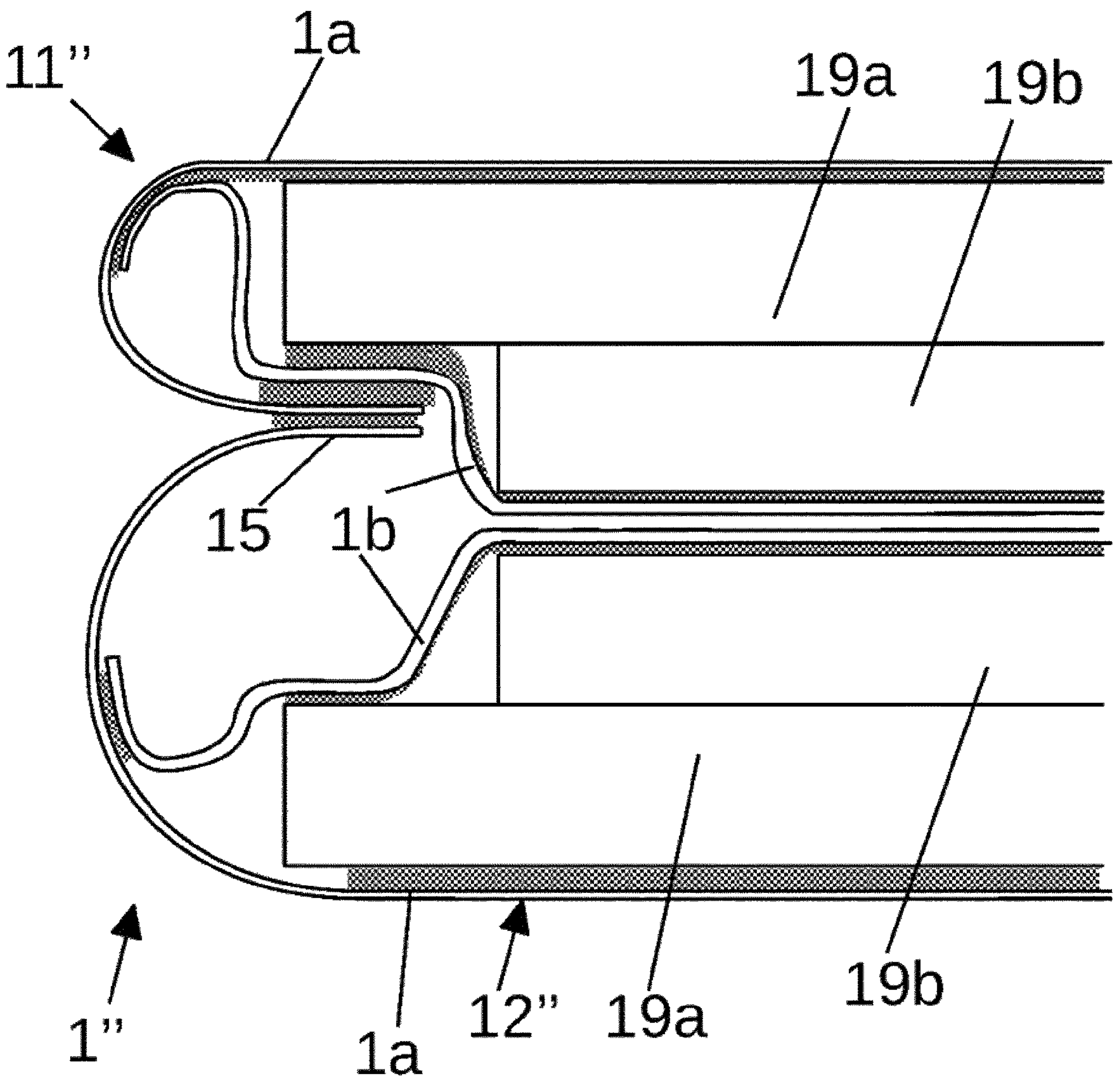
[Fig. 7]
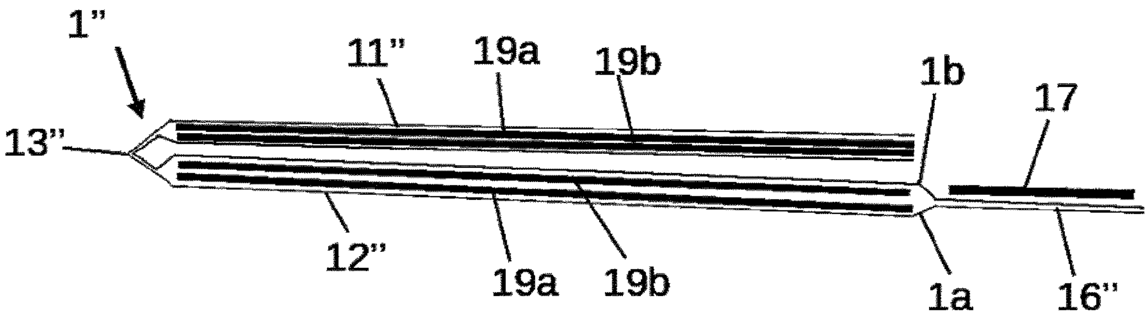

METHOD AND MACHINE FOR MANUFACTURING A FLEXIBLE ENVELOPE-LIKE BAG, PARTICULARLY WITH REINFORCEMENT

CROSS-REFERENCE TO RELATED APPLICATIONS

This is a National Stage application of PCT International Application PCT/EP2022/062444, filed on May 9, 2022, which claims the benefit of French Patent Application FR2105064, filed on May 12, 2021, both of which are incorporated herein by reference in their entirety.

TECHNICAL FIELD

The invention concerns the continuous manufacture of envelope-type flexible bags from a sheet of flexible material, particularly paper. It also concerns the addition of reinforcement layers providing mechanical and/or thermal characteristics in particular.

PRIOR ART

Industrial processes for manufacturing bags made of flexible materials such as paper or synthetic material have been known for a long time. For example, document FR 1 270 400 describes a machine and a process in which a strip is unreeled and formed into a tube. The tube is flattened in such a way that it comprises a first and a second wall, then the tube is cut into sections in such a way that at each end of the section there is a tab which prolongs the first or second wall. In a folding step, the tab is folded and bonded while being turned down on to the other wall than the one it extends from. It is thus possible to manufacture bags at a high rate with a large variety of materials and formats.

Document FR 786 579 shows several examples of this technique. In particular, in FIGS. 4 to 6 it shows a manufacturing process in which the strip of paper includes transversal perforated lines at regular intervals, with a line at the centre and two lines, axially offset with respect to the central line on each edge of the strip. The tube is formed by folding each edge over the central part and sticking two edges together along a central join in such a way that the central perforations form two transversal lines respectively offset on one and the other faces of the tube. The tube thus formed passes between a pair of drive rollers that drive the tube at a constant speed. The front part of the tube is gripped by the folding device which comprises a contra-rotary drum and folding roller. The drum and the folding roller rotate at a peripheral speed higher than that of the pair of drive rollers. The folding roller comprises a bar that is able to pinch the front of the tube against the drum, in such a way that the front part of the tube is pulled and separated by tearing along the perforations to form a section. On separation, owing to the offsets between the lines of perforations, a rear tab is thus formed on the section, as well as a front tab at the end of the tube. This front tab will be situated on the next section. The front tab is folded by the folding device on to an adhesive-coated area to close the front part of the section. To achieve this, the roller also comprises a folding blade, just behind the bar, which pushes the tube into a pincher carried by the drum in such a way as to fold the tube.

In a variant, the tube is formed with bellows linking the first and second walls. Document WO 2016 097310 A1 shows an example of such bags. This document also shows a machine that is used to form an envelope from the tube using two stations each of which comprises a pair of contra-rotary cylinders whose work makes it possible to make the separation into sections and tear off a waste piece to reveal a tab at the front of the section on the same wall as the rear tab. Thus, after folding the tabs, they are applied to the same wall.

Such bags can be used as mail envelopes. In this case, the rear tab has an adhesive coat, for example protected by means of a protection such as a sheet of siliconized paper. This sheet can be removed, revealing the adhesive coat. The rear tab serves as a closure flap which can be folded to bring the adhesive coat against the wall opposite the one that the rear tab extends from, in such a way that the adhesive coat sticks to the wall, sealing the envelope. Thus, the wall that the tabs extend from has a smooth face when the tabs are stuck to the opposite face to close the envelope. When the envelope is received by its addressee, the latter tears the end of the envelope, for example at the level of the flap, to access the latter's content.

When manufacturing the bags, the removal of the waste piece is a limitation: on the one hand, it can be seen this is a limiting factor for the speed of bag manufacturing, and on the other hand the large amount of waste pieces is always a constraint that must be managed. Furthermore, the adjustment of such a machine requires a high level of technical expertise. A great deal of time is required to make the adjustment when changing the format of the bags, particularly in the case of a change of width, because the means of perforation will have to be changed.

The above-mentioned document FR 1 270 400 also describes a manufacturing process that can be used to make envelopes. A continuous sheet of paper is unreeled and then cuts are made on the edges in such a way as to create symmetrical bonding seams with respect to a longitudinal middle of the sheet and extending along an area of the sheet called the first flap. The seams are folded longitudinally on the sheet and coated with adhesive on the upper face, opposite the first flap. The sheet is cut into sections, for example by a clean cut and folded along a transversal crease to delimit the second flap which is folded over the first flap. The second flap is thus bonded to the seams and the container is delimited between the first flap and the second flap. The cut is made in such a way that a tab remains prolonging the first flap opposite the transversal crease.

The fact of making a clean cut instead of tearing gives a bag with a quality that is perceived as being better, the edge being sharper. However, this process also generates waste when making the lateral seams.

Document EP-3564146-A1 shows a bag manufacturing process that is quite similar to that in FR 1 270 400, but differs in that no cut is made in the edge. The flaps folded one on the other are bonded together along the edges. The process therefore does not generate any waste, but the useful width of the bag is reduced by the width of the areas bonded to each other. Furthermore, this type of bonding is more fragile because the constraints for separating one flap from the other are concentrated on the edge of the adhesive area.

Furthermore, there are needs for envelopes comprising reinforcements, either to make them stronger and better protect the content, or to insulate the content thermically or against impacts.

DESCRIPTION OF THE INVENTION

The invention aims to provide a process and a machine for manufacturing at high speed such envelope-type bags, with or without bellows, that does not generate any waste, makes it possible to strengthen the bag and is easy to adjust. The invention also aims to propose a bag produced in this way.

With these goals in view, the object of the invention is a process for manufacturing flexible bags, whereby:

a first strip of flexible material is unreeled as a continuous sheet in a longitudinal direction, a fold is made on the first strip along a transversal folding crease to fold a first flap onto a second flap against an internal face of the first strip, the first and second flaps are brought together along the edges, the strip is cut transversely to form a section before or after the folding of the flaps one onto the other, the section forming the bag at the end of the operations;

characterised by the fact a hem is formed on each edge of the first strip before folding and adhesive is applied to the hems at least over one length of the first or second flap on one seam face, the folding bringing for each edge hem against hem by the seam face in such a way as to obtain bonding of the hems to each other to bring the first and the second flaps together along the edges.

This process makes it possible to produce envelope-type bags without producing waste, so without limitation on the production rate caused by having to manage the removal of such waste. The process uses the principle described in document FR 1 270 400 but without having to cut the edges. Indeed, the edges are folded over their whole length to form the hems and the latter are folded one onto the other after application of adhesive to assemble the two folded flaps one on the other. Cutting can be achieved by a clean-cutting means, that is to say by shearing, which gives a good perceived cutting quality. Cutting could also be achieved with a toothed knife cooperating with a groove to obtain the separation without any prior perforation lines. Cutting could also be obtained by tearing, that is to say by traction on a portion that has perforations initiating a cutting line. The cutting system is the same whatever the width of the bag to be made. It is therefore easy to change the width unlike for the manufacture of pouch-type bags by tearing off a waste piece which requires the installation of a special tool to make the perforations specific to the width. The flexible material could, for example, be paper with varying grammages, for example between 40 and 150 g/m$^2$, synthetic material, textile or a combination of these materials.

As per an improvement, at least one reinforcement layer is unreeled, the reinforcement layer is cut to obtain a system with at least one reinforcement panel, a first application of adhesive is made at least on one of the elements among the first strip and the system with at least one reinforcement panel, before folding, the first strip and the system with at least one reinforcement panel are brought together on the internal face of the first strip to stick them together by means of a first application of adhesive, in such a way that the system with at least one panel is situated between the first and second flaps.

We have thus produced a bag whose interior wall includes one or more reinforcement panels. The visual appearance of the exterior of the bag remains more or less the same, the reinforcement panels being hidden inside the bag. Each reinforcement panel can be formed by superposing multiple layers. The materials can be varied such as embossed paper to provide a layer of mechanical and thermal protection, a sheet of synthetic foam or including bubbles, or a reflective sheet.

As per an accomplishment mode, the length of the flaps is not the same in the longitudinal direction, in such a way that the second flap comprises a tab that is not covered by the first flap after folding, the tab not being covered by the reinforcement panel. The process makes it possible to manufacture envelope bags with the tab that is used to close the bag by folding over the first flap. As required for envelopes, the second flap remains free.

As per an improvement, a second strip of flexible material is unreeled, a second application of adhesive is made, and the second strip and the first strip are brought together on the internal face of the first strip, so they adhere to each other thanks to the second application of adhesive. This additional strip is used to provide specific properties for the interior of the bag, for example by providing a smooth surface inside the bag in the case where an embossed reinforcement is used or with a rough or adhesive surface. Preferably, it extends over the same length as the first strip.

In a special way, the system with at least one reinforcement panel is taken between the first and the second strip. Thus, the second strip is used to enclose the reinforcement panels.

As per one characteristic, the widths of the first and of the second strips are different in such a way that the hems extend from just one of said strips. This makes it possible to have a strip that serves as a mechanical reinforcement for the other strip, but without hindering the folding of the hems when they are formed.

As per an alternative characteristic, the width of the second strip is identical to that of the first strip. In this case the hems are formed by two layers, which reinforces them mechanically.

As per an accomplishment mode, a cheek is also formed on each edge of the first strip, the cheek being folded against the internal face and extending between the hem and a central part of the strip, in such a way that a stack is formed with, in this order, the central part, the cheek and the hem, the cheeks forming a bellows linking the first and second flap after the bonding of the hems, the system with at least one reinforcement panel not extending over the cheeks when the bag has cheeks. Considering the section of an edge of a flap, the central part, the cheek and the hem form a sort of Z which is flattened during manufacturing but can be deployed when using the bag.

As per an accomplishment mode, the system with at least one reinforcement panel comprises just one panel which extends over the first and the second flap. We enable a reinforcement of the flaps, including at the level of the folding crease.

As per another accomplishment mode, to form the system with at least one reinforcement panel, two reinforcement panels are successively cut out and placed, one on the first flap and the other on the second flap leaving an interval between them at the level of the transversal crease. Although this solution is more demanding, it makes it possible to use highly rigid reinforcement panels, while making it possible to easily make the folding crease.

As per an improvement, an area of closing adhesive is applied and a protection strip is placed on the area of closing adhesive so that they can be seen on the tab when the first flap is visible. This protection strip can be removed by the user before folding the tab onto the first flap and thus bond the tab to close the bag. This area of adhesive and this protection strip can be applied together or successively at different stages of the process. They can be applied, for example, directly after the unreeling of the first strip on the internal face, directly after the unreeling of the second strip where applicable, after cutting or even after the formation of the folding crease.

As per an improvement, the hem is also stuck to the face opposite the seam face solely along either the first flap or the second flap. Thus, considering one of the edges of the manufactured bag, the two hems are superposed and stuck to each other and, in addition, one of them only is stuck to the cheek where applicable, or to the internal face of the flap. It can be noted that this disposition makes it possible to stress the bonding essentially by sliding one hem over the other, whereas without bonding, the constraint is concentrated on the edge of the bonding and tears the bonding more easily.

As per an improvement, separate reinforcement strips are applied on the cheeks. This makes it possible to keep the flexibility of the join between the cheeks and the central part of the flaps while having a reinforcement of the cheeks. This also makes it possible to modulate the stiffness of the reinforcement panels between the central part and the cheeks.

Another object of the invention is a bag made of a flexible material comprising a first and a second flap extending from the same sheet folded along a transversal folding crease towards an internal face and brought together along the edges of the flaps perpendicular to the folding crease, characterised by the fact it comprises a hem formed on each edge, the hem of the first flap being stuck to the hem of the second flap on seam faces. The process such as described previously makes it possible to obtain such bags.

As per an improvement to the bag, the hem is linked to a central part of the flap by means of a cheek folded onto the central part, in such a way that a bellows is formed by two cheeks linked by the hems stuck to each other.

As per an improvement, a system with at least one reinforcement panel extends against the internal face of the flaps.

As per an improvement, a second strip of flexible material is bonded to the internal face of the first strip of flexible material and, in the case of the bag with a system with at least one reinforcement panel, the second strip of flexible material covers the system with at least one reinforcement panel. The second strip makes it possible to reinforce the bag, and give it specific properties that the first strip and the reinforcement panels do not have, for example for liquid-tightness.

As per an improvement, the system with at least one panel comprises several superposed reinforcement panels, the reinforcement panels having decreasing widths, each panel being bonded to either the first or the second strip by the surface not covered by the adjacent panel. Thus, it is not necessary to ensure bonding of the panels superposed over each other. A link to each panel is made with one of the strips, which ensures the positioning of the panels between the strips.

As per an improvement, the first flap is shorter than the second flap and leaves a tab extending from the second flap not covered by the first flap. There is therefore a tab making it possible, in particular, to close the bag by folding the tab onto the first flap, leaving the second flap with a smooth appearance.

The object of the invention is also a machine for manufacturing flexible bags comprising:

- a first unreeling means for unwinding a first strip of flexible material as a continuous sheet in a longitudinal direction,
- a folding means for forming a fold in the first strip along a transversal folding crease for folding a first flap onto a second flap against an internal face of the first strip,
- an assembly means for bringing the first and second flaps together along the edges,
- a first cutting means for cutting the strip with a transversal cut to form a section upstream or downstream of the assembly means, the section forming the bag at the end of the operations;

characterised by the fact it also comprises:

- a hemmer for each edge, for forming a hem on each edge of the first strip upstream of the assembly means,
- an application means for applying adhesive to the hems over at least one length of the first or of the second flap on one seam face,
- the assembly means being the folding means configured to bring back for each edge hem against hem by the seam face so as to obtain bonding of the hems to each other and bring the first and second flaps together along the edges.

The upstream and downstream directions are defined with respect to the unreeling direction of the first strip. Such a machine is able to produce bags continuously such as described previously at a high rate, for example at rate of several hundreds of bags per minute. The hemmer could for example be a guide that causes the edge to fold over during the unreeling of the strip followed by a pair of rollers that grip the edge to mark the crease. The folding means are known, for example in document FR 1 270 400.

As per an improvement, the machine also comprises:

- a feed means for supplying at least one reinforcement layer,
- a second cutting means for cutting the reinforcement layer and thus obtain a system with at least one reinforcement panel,
- a first adhesive application means for the first application of adhesive on at least one of the elements among the first strip and the system with at least one reinforcement panel,
- an intake means, upstream of the folding means and downstream of the first adhesive application means and of the feed means, configured to bring the first strip and the system with at least one reinforcement panel together on the internal face of the first strip to stick them together thanks to the adhesive application, in such a way that the system with at least one panel is situated between the first and second flaps.

The first strip and reinforcement layer are unreeled in parallel then brought together by the intake means, consisting for example of a pair of contra-rotary rollers. The reinforcement layer is cut beforehand. The adhesive is applied either to the internal face of the first strip, in the area intended to receive the reinforcement layer, or on the panel. If you want to use several reinforcement layers, they are unreeled individually then assembled by other intake means before being presented to the second cutting means. For example, several layers of paper can be passed together through the intake means which also serves as embosser, that is to say which comprises two complementarily textured cylinders, in order to make hollows and bulges on the layers. The embosser is followed by a separator to separate each of the reinforcement layers and offset them with respect to each other so that the bulges are facing the bulges. In this way the stack of layers is made thicker to ensure a cushioning function.

As per an improvement, the machine comprises:

a second unwinding device for unreeling a second strip of flexible material, a second adhesive application means for making a second adhesive application, an intake means also configured to assemble a second strip and a first strip on the internal face of the first strip so they stick together thanks to a second adhesive application. This makes it possible to make bags with a lined wall, therefore mechanically reinforced or with other properties different from those of the first strip. The second adhesive application can be made on the second strip upstream of the intake means, or on the first strip when reinforcement panels are not used. When reinforcement panels are used, the second strip should preferably be wider than the panels in order to obtain a link between the first and second strips and thus enclose the panels.

As per an improvement, the machine also comprises a cheek formation station also configured to form a cheek on each edge of the first strip, the cheek being folded against the internal face and extending between the hem and a central part of the strip, in such a way that a stack is made with, in this order, the central part, the cheek and the hem, the cheeks forming a bellows linking the first and second flaps after the bonding of the hems, the system with at least one reinforcement panel, when there is one, not extending over the cheeks. When a second strip is used, its width may be limited so as not to cover the cheeks or, on the contrary, also line the cheeks and possibly the hem.

BRIEF DESCRIPTION OF THE FIGURES

The invention will be better understood and other features and advantages will appear on reading the following description, the description referring to the attached drawings among which:

FIG. 1 is a perspective view of a bag as per a first accomplishment mode;

FIG. 2 is a transverse sectional view of the bag in [FIG. 1];

FIG. 3 is a view similar to [FIG. 1] of the closed bag;

FIG. 4 is a perspective view of a partially made bag in [FIG. 1] during manufacturing;

FIG. 5 is a view similar to [FIG. 1] of a bag as per a second accomplishment mode;

FIG. 6 is a transverse sectional view of the bag as per a third accomplishment mode;

FIG. 7 is a sectional view as per a middle plane of the bag in [FIG. 6];

DETAILED DESCRIPTION

Figure 8:
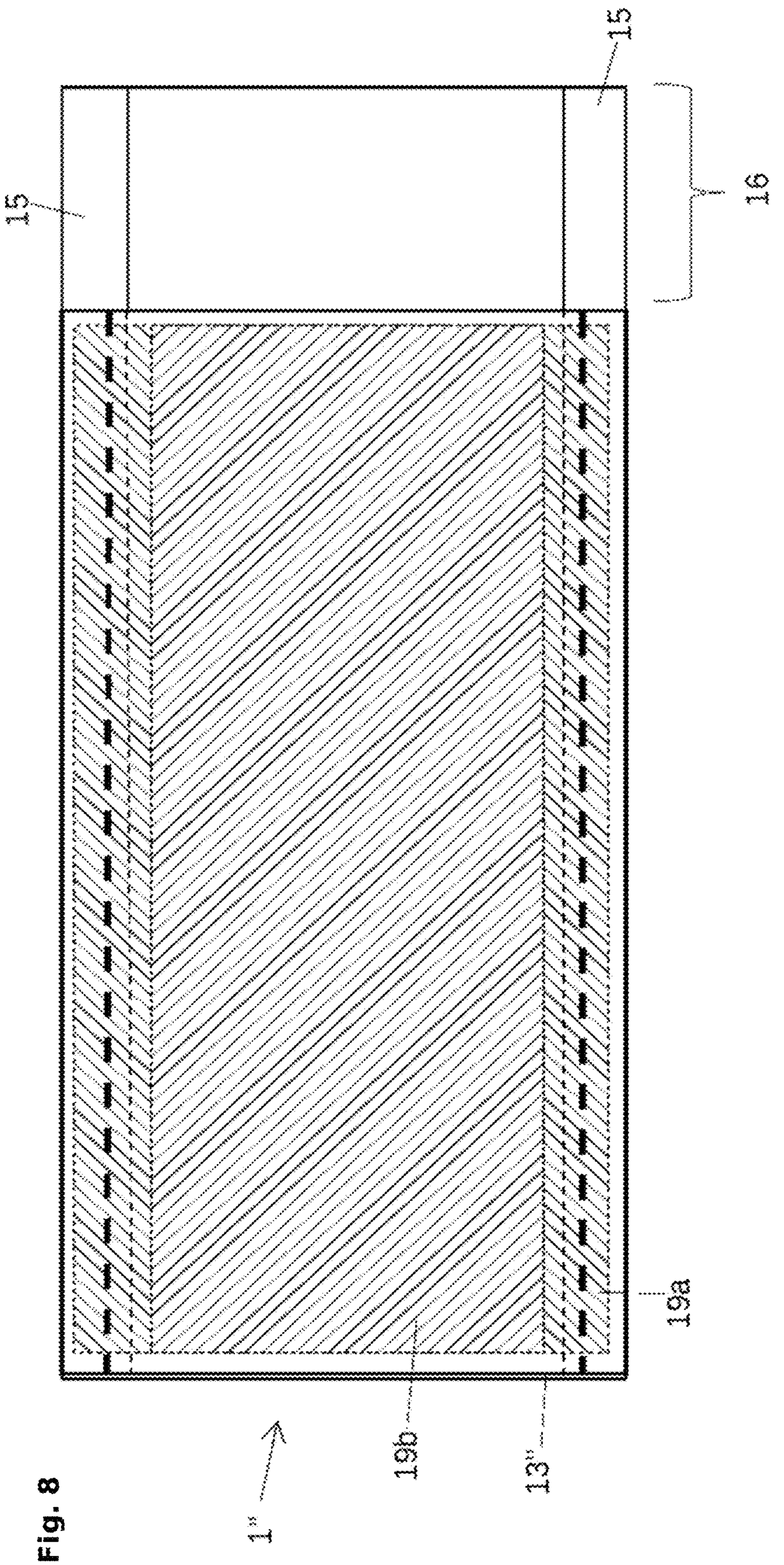
FIG. 8 is a top view of the bag in [FIG. 6]

A bag 1 envelope as per the invention's first accomplishment mode is shown in FIGS. 1 to 4. The bag 1 made with a flexible material comprises a first and second flap 11, 12 extending from the same sheet folded along a transversal folding crease 13 towards an internal face 14. The flaps 11, 12 are brought together along their edges which are perpendicular to the folding crease 13. A hem 15 is formed on each edge and bonded to the internal face 14 of the second flap 12. Furthermore, the hem 15 of the first flap 11 is bonded to the hem 15 of the second flap 12 on seam faces 150. The first flap 11 is shorter than the second flap 12 in such a way that a tab 16 remains while being the part of the second flap 12 not covered by the first flap 11. A coat of adhesive is applied to part of the tab 16 and is entirely covered with a protection strip 17 made of siliconized paper. After the manual removal of the protection strip 17, the tab 16 can be folded onto the first flap 11 in order to be bonded and thus close the envelope, as shown in [FIG. 3]. [FIG. 4] shows the bag 1 in a manufacturing step before the folding of the first flap 11 onto the second flap 12.

In an accomplishment mode, the bag l' differs from that of the first accomplishment mode in that the hem 15' is linked to a central part 110 of the flap 11', 12' by means of a cheek 181 folded onto the central part 110, in such a way that a bellows 18 is formed by two cheeks 181 linked by the hems 15' stuck together.

In a third accomplishment mode for making bag 1", shown in FIGS. 6 to 8, the flaps 11", 12" are formed by superposing a first strip 1*a*, a first reinforcement panel 19*a*, a second reinforcement panel 19*b* and a second strip 1*b*. The first reinforcement panel 19*a* is not as wide as the first strip 1*a* and the second reinforcement panel 19*b* is not as wide as the first reinforcement panel 19*a*. The second strip 1*b* is not as wide as the first strip 1*a* but wider than the first reinforcement panel 19*a*. In the transverse sectional view in [FIG. 7] it can be seen that the first strip 1*a* comprises some adhesive on the internal face 14 in such a way that the first reinforcement panel 19*a* is bonded to it. Likewise, the second strip 1*b* comprises some adhesive on the internal face 14 in such a way that it is bonded to the second reinforcement panel 19*b*, to the first reinforcement panel 19*a* on the edges not covered by the second reinforcement panel 19*b*, and on the first strip 1*a* between the hem 15 and the edge of the first reinforcement panel 19*a*. In the longitudinal sectional view, the reinforcement panels 19*a*, 19*b* are interrupted at the level of the folding crease 13". Furthermore, the reinforcement panels 19*a*, 19*b* do not extend over the tab 16" which is thus formed from the superposing of the two strips 1*a*, 1*b* only.

Figure 9:
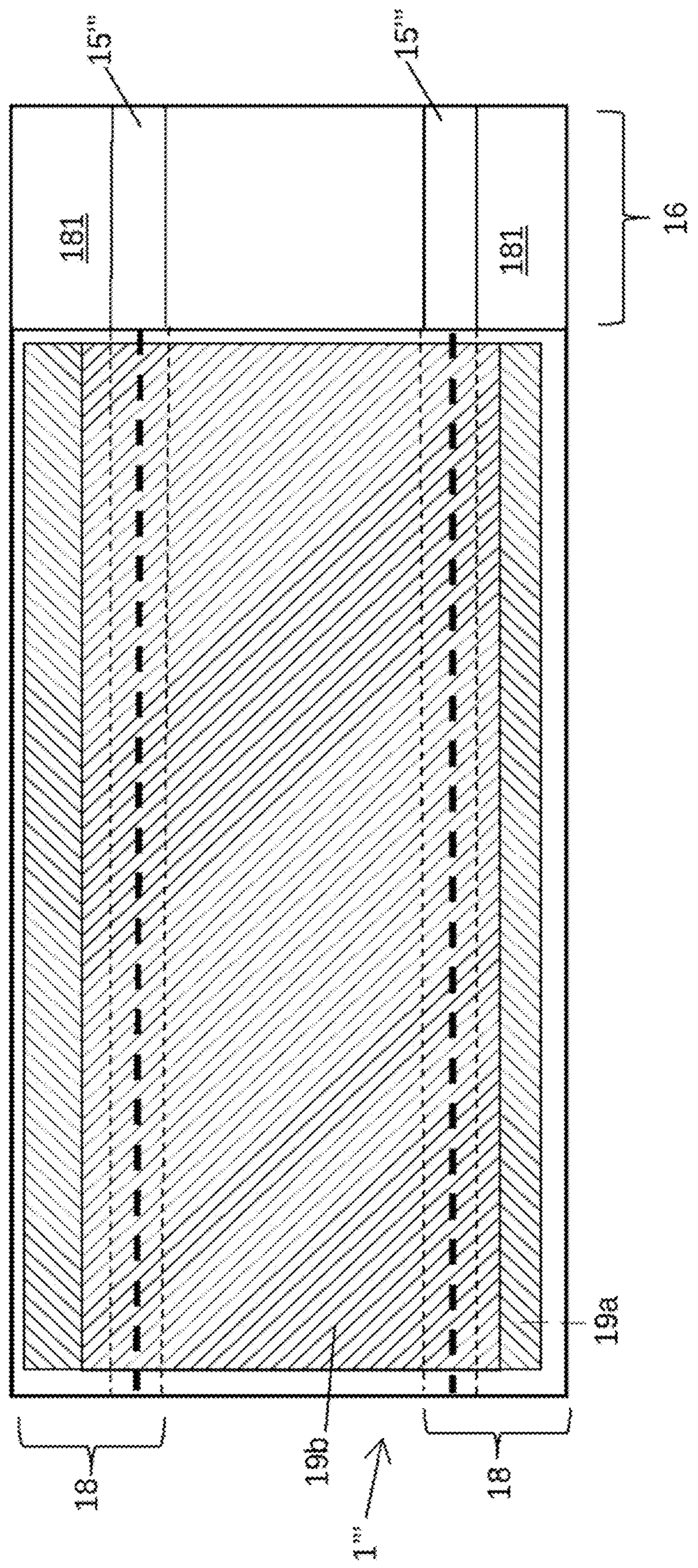
FIG. 9 is a view similar to that in [FIG. 8] of a bag with bellows.

In a fourth accomplishment mode, shown in [FIG. 9], the bag 1'" differs from that of the third accomplishment mode in that the hem 15'" is linked to a central part 110 of the flap by means of a cheek 181 folded onto the central part 110, in such a way that a bellows 18 is formed by two cheeks 181 linked by the hems 15"" bonded together.

Figure 10:
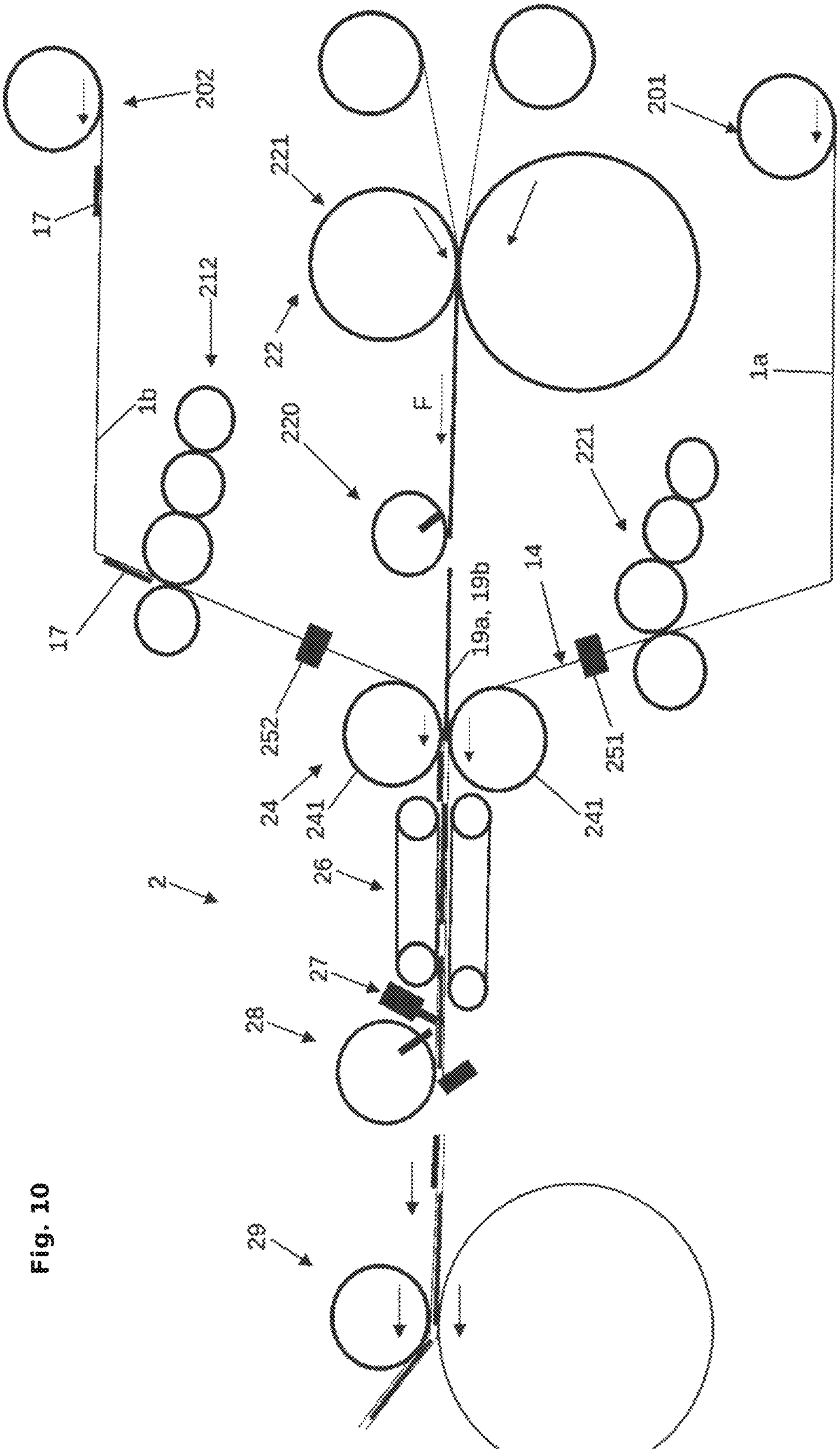
FIG. 10 is a schematic view of a machine conform to a first accomplishment mode of the invention.

A machine 2 as per a first accomplishment mode of the invention enabling the manufacture of bags is shown schematically in [FIG. 10]. The machine 2 comprises:

a first unwinding means 201 for unreeling the continuous strip of flexible material in a longitudinal direction;

a first means of adhesive application 211 for making a first application of adhesive at least on the first strip 1*a*, a feed means 22 for supplying the reinforcement layer, a second cutting means 220 for cutting the reinforcement layer and thus obtain a reinforcement panel 19*a*, 19*b*, a second unwinding means 202 for unreeling the second strip 1*b* of flexible material,

- an application means 23 for applying a coat of adhesive and a protection strip 17 on the coat of adhesive on the second strip 1*b* at regular intervals,
- a second means of adhesive application 212 to make a second adhesive application on the second strip 1*b*,
- an intake means 24 also configured to assemble the second strip 1*b* and the first strip 1*a* with the reinforcement panels 19*a*, 19*b* between them on the internal face 14 of the first strip 1*a*,
- a hemmer 251 for each edge to form a hem 15 on each edge of the first strip upstream of the intake means 24,
- a transport means 26 for guiding the assembly of the strips downstream of the intake means 24;
- an application means 27 for applying adhesive to the hems 15 over at least one length of the first or second flap 12 on a seam face 150,
- a first cutting means 28 for cutting the strip with a transversal cut to form a section forming the bag 1 at the end of the operations;
- an assembly means, for bringing the first and second flaps 11, 12 together along the edges, made by folding means 29 to form a folding of the first strip 1*a* along a transversal folding crease 13, to fold the first flap 11 onto the second flap 12 against an internal face 14 of the first strip 1*a*, and to bring the hem 15 against hem 15 for each edge by the seam face 150 in such a way as to obtain the bonding together of the hems 15 to bring the first and second flaps 11, 12 together along the edges,
- a stacking means, not shown, to stack the bags downstream of the folding means 29.

Optionally, the machine comprises another hemmer 252 for making a hem on the edges of the second strip 1*b* in the case where the second strip is wider than the first strip and where the hems are only supported by the second strip 1*b*.

The first and second adhesive application means 211, 212 are, for example, flexographic rollers making it possible to apply adhesive according to a predetermined pattern. The adhesive is applied on the internal face 14 of the strip; that is to say on the face opposite the other strip after assembly.

The intake means 24 is made with a pair of contra-rotary rollers 241 driven by a motor, not shown. They apply a pressure to the strips 1*a*, 1*b* to obtain bonding between them and to the reinforcement panels 19*a*, 19*b*.

The feed means 22 also comprises intake means 221 for bringing together two reinforcement strips, then the second cutting means 220 for cutting the strips assembled into panels 19*a*, 19*b*, as detailed below.

The transport means 26 should preferably be means functioning by suction so as not apply any forces through the thickness of the assembly.

The application means 27 shall, for example, be nozzles injecting adhesive intermittently.

The first cutting means 28 and the folding means 29 are conventional and are not described here. The various parts are driven in rotation either by the same motor and synchronous mechanical transmissions such as cog belts or gears, or by several individual electronically synchronised motors, or a combination of the two solutions.

Figure 11:
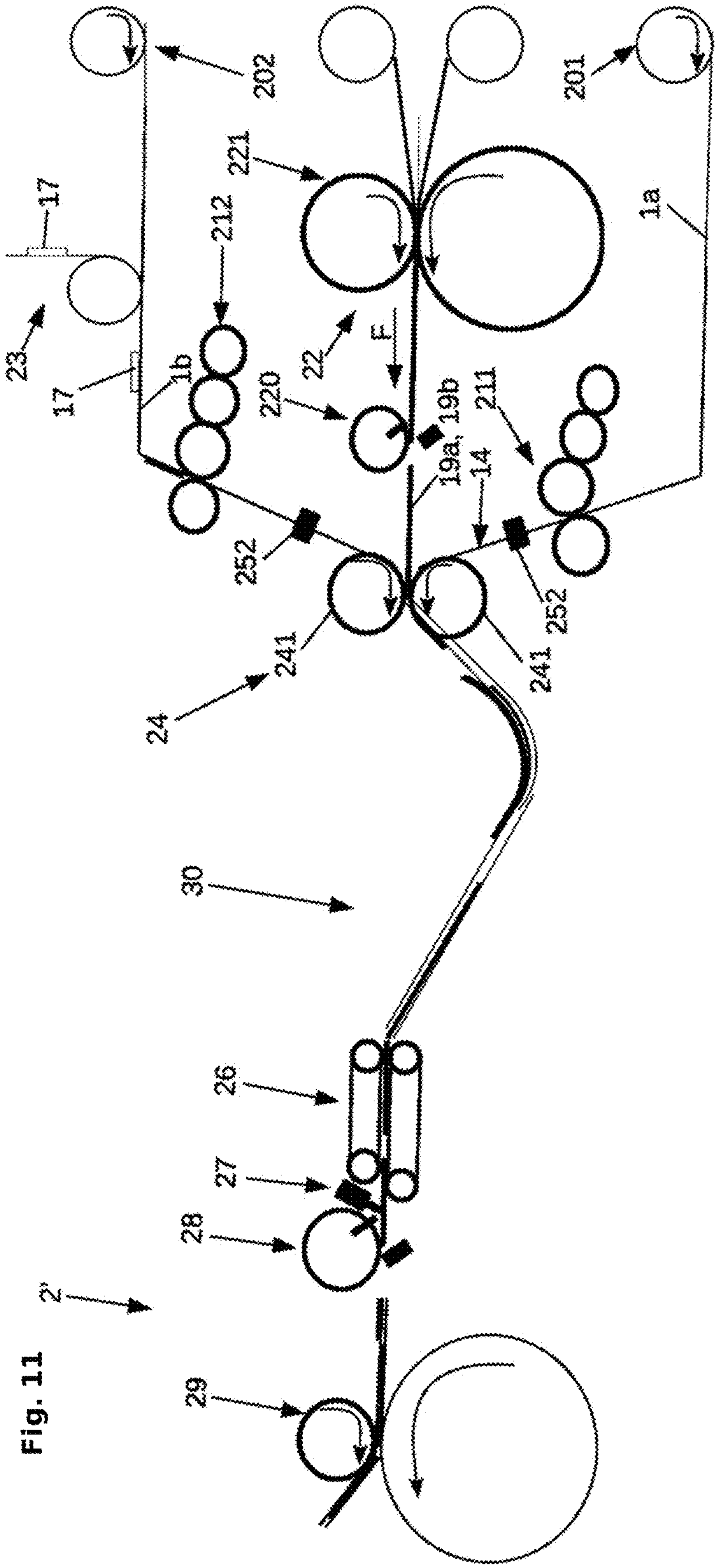
FIG. 11 is a schematic view of a machine conform to a second accomplishment mode of the invention.

A machine 2' conform to a second accomplishment mode, shown in [FIG. 11], is provided to make bags with bellows 18. It differs from that of the first accomplishment mode in that a cheek formation station 30 is also provided downstream of the intake means 24 and configured to also form a cheek 181 on each edge of the first strip 1*a* or of the superposing of the strips 1*a*, 1*b*.

Figure 12:
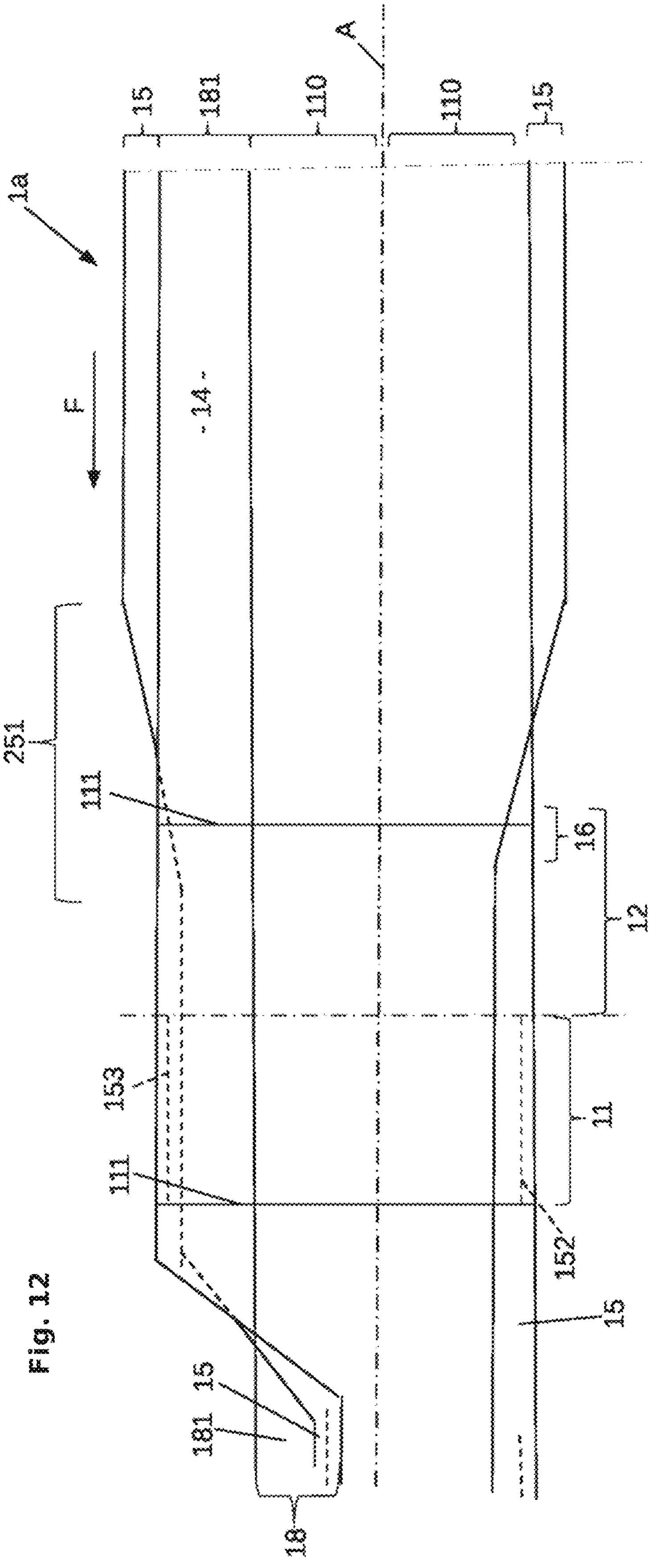
FIG. 12 is a schematic view of the first strip in the machine in [FIG. 8] for the lower part and in the machine in [FIG. 9] for the upper part of the view.

FIG. 12 shows the first strip 1*a* of flexible material seen from the top, therefore presenting its internal face 14, from its unreeling on the right to the formation of the bag 1 on the left. The upper part above a middle centreline A represents the version of a bag 1' as per the second accomplishment mode, that is to say with bellows 18, whereas the lower part shows the version of the bag 1 as per the first accomplishment mode, that is to say without bellows. For the first accomplishment mode, the width of the strip is subdivided into a central part 110 and a hem area 15. The hemmer 251 comprises an application means, not shown, which applies adhesive at intervals on the edge of the hem area 15 over the length represented by the dashed line 152 corresponding to the first flap 11, then, in the hemmer 251, the hem area 15 is turned over against the central part 110 on the internal face 14. Thus, the hem is bonded on its internal face at intervals, along the area symbolized by the line 152. The application means may for example be In the second accomplishment mode, the width of the strip is subdivided into a central part 110, a cheek 181 and a hem area 15. By passing through the hemmer's application means, not shown, adhesive is applied at intervals on the edge of the hem area 15 over the length represented by the dashed lines 153 corresponding to the first flap 11, on the external face, opposite the internal face 14. The hem 15 is formed when passing through the hemmer 251 by folding over onto the external face and is stuck onto the length extending from the future cutting 111 of the section to the future folding crease 13, along what will be the first flap 11. Downstream of the intake means 24, the first strip 1*a* passes through the cheek formation station 181 in which the cheeks 181 are folded against the internal face 14 of the first strip 1*a*. The hem 15 becomes visible again above the first strip 1*a*, when looking at the internal face 14. After folding the cheek 181 against the internal face 14, the latter extends between the hem 15 and a central part 110 of the strip, in such a way that a stack is formed with, in the following order, the central part 110, the cheek 181 and the hem 15.

In both accomplishment modes, the visible face of the hems 15, also called seam face 150, is coated with adhesive over the same lengths on both sides of the future folding crease 13, then the first strip 1*a* is cut by the first cutting means 28 into sections, at the level of the cutting line 111. The sections are transferred to the folding means 29 which forms the folding crease 13 and folds the first flap 11 onto the second flap 12. The hems 15 of the first flap 11 then adhere to the hems 15 of the second flap 12 and the bag 1 is formed, as shown in [FIG. 1] for the bag 1 without bellows, or [FIG. 5] for the bag 1 with bellows 18.

Figure 13:
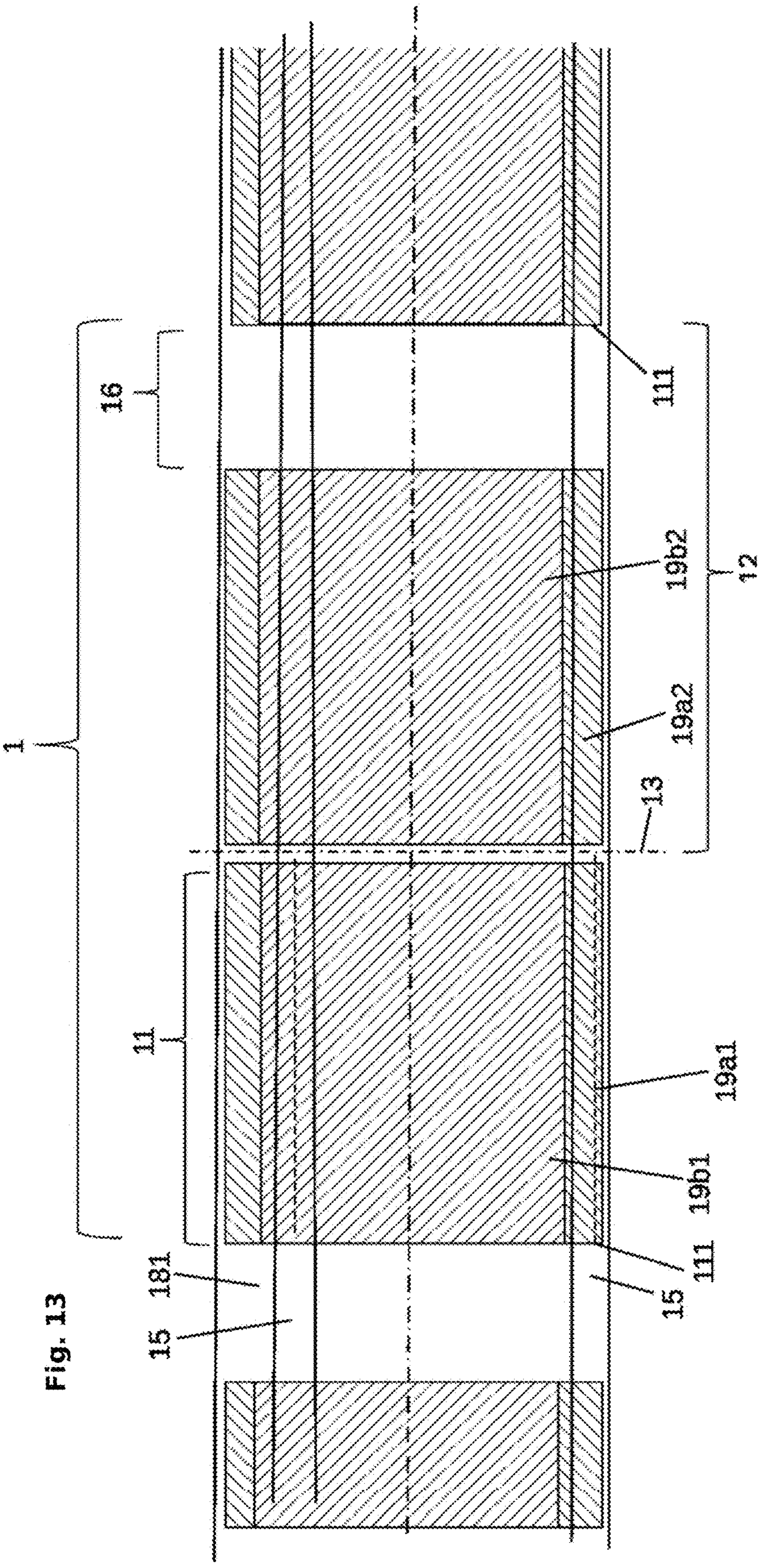
FIG. 13 is a schematic view of the assembly of the strips before being cut into sections.

[FIG. 13], constructed like [FIG. 12], details the assembly of the strips when the bags are made with reinforcement panels, here with two thicknesses. The intake means 221 of the feed means 22 takes two layers of reinforcement and superposes them, the layer on the first strip 1*a* side being wider than the other one. The second cutting means 220 cuts a first part of the reinforcement panel 19*a*1, 19*b*1 which will extend over the first flap 11, then a second part of the reinforcement panel 19*a*2, 19*b*2 which will extend over the second flap 12. A small interval is created between the first and second parts of the reinforcement panel in order to allow the easy creation of the folding crease 13. The intake means 221 of the feed means 22 slows down the reinforcement strip feed to allow the creation of an interval on the second flap 12 between the second part of the panel and the first part of the next section, this interval being the space for tab 16. The reinforcement panels only extend over the central part 110 of the first strip 1*a*, and therefore not over the cheeks 181 in the case of a bag 1' with bellows 18, even if this is technically possible for flexible panels.

The invention is not limited to the accomplishment modes which are described as examples only. The protection strip 17 and the coat of adhesive that it protects are optional or could take various forms.

What is claimed is:

1. A process for manufacturing flexible bags, whereby:
- a first strip of flexible material is unreeled as a continuous sheet in a longitudinal direction,
- a fold is made on the first strip along a transversal folding crease to fold a first flap onto a second flap against an internal face of the first strip,
- the first and second flap are brought together along the edges,
- the strip is cut by a transversal cut to form a section before or after the folding of the flaps one onto the other, the section forming the bag at the end of the operations,
- wherein a hem is formed on each edge of the first strip before folding and adhesive is applied to the hems at least over one length of the first or second flap on one seam face,
- the folding bringing for each edge hem against hem by the seam face in such a way as to obtain bonding of the hems to each other to bring the first and the second flaps together along the edges,
- at least one reinforcement layer is unreeled,
- the reinforcement layer is cut to obtain a system with at least one reinforcement panel,
- a first application of adhesive is made at least on one of the elements among the first strip and the system with at least one reinforcement panel, and
- before folding, the first strip and the system with at least one reinforcement panel are brought together on the internal face of the first strip to stick them together by means of a first application of adhesive, in such a way that the system with at least one reinforcement panel is situated between the first and second flaps.

2. The process according to claim 1, whereby the length of the flaps is not the same in the longitudinal direction, in such a way that the second flap comprises a tab that is not covered by the first flap after folding, the tab not being covered by the system with at least one reinforcement panel.

3. The process according to claim 2 whereby an area of closing adhesive and a protection strip is applied to the closing adhesive area so they can be seen on the tab when the first flap is visible.

4. The process according to claim 1, whereby the system with at least one reinforcement panel is taken between the first and second strips.

5. The process according to claim 1, whereby a cheek is also formed on each edge of the first strip, the cheek being folded against the internal face and extending between the hem and a central part of the strip, in such a way that a stack is formed with, in the following order, the central part, the cheek and the hem, the cheeks forming a bellows linking the first and second flaps after bonding of the hems, the reinforcement panel not extending over the cheeks.

6. The process according to claim 1, whereby a cheek is also formed on each edge of the first strip, the cheek being folded against the internal face and extending between the hem and a central part of the strip, in such a way that a stack is formed with, in the following order, the central part, the cheek and the hem, the cheeks forming a bellows linking the first and second flaps after bonding of the hems and whereby the separate reinforcement strips are placed on the cheeks.

7. The process according to claim 1, whereby the system with at least one reinforcement panel comprises a single panel which extends over the first and second flaps.

8. The process according to claim 1, whereby, in order to form the system with at least one reinforcement panel, two reinforcement panels are successively cut and positioned, one on the first flap and the other on the second flap leaving an interval between them at the level of the folding crease.

9. The process according to claim 1, whereby the hem is also stuck to the face opposite the seam face along just one of the elements among the first and second flap.

10. A process for manufacturing flexible bags, whereby:
- a first strip of flexible material is unreeled as a continuous sheet in a longitudinal direction,
- a fold is made on the first strip along a transversal folding crease to fold a first flap onto a second flap against an internal face of the first strip
- the first and second flap are brought together along the edges,
- the strip is cut by a transversal cut to form a section before or after the folding of the flaps one onto the other, the section forming the bag at the end of the operations,
- wherein a hem is formed on each edge of the first strip before folding and adhesive is applied to the hems at least over one length of the first or second flap on one seam face,
- the folding bringing for each edge hem against hem by the seam face in such a way as to obtain bonding of the hems to each other to bring the first and the second flaps together along the edges, and whereby a second strip of flexible material is unreeled, a second application of adhesive is made, and the second strip and the first strip are brought together on the internal face of the first strip so they adhere to each other thanks to a second application of adhesive.

11. The process according to claim 10, whereby the widths of the first and second strips are different in such a way that the hems extend from just one of said strips.

12. The process according to claim 10, whereby the width of the second strip is the same as that of the first strip.

13. A process for manufacturing flexible bags, whereby:
- a first strip of flexible material is unreeled as a continuous sheet in a longitudinal direction,
- a fold is made on the first strip along a transversal folding crease to fold a first flap onto a second flap against an internal face of the first strip,
- the first and second flap are brought together along the edges,
- the strip is cut by a transversal cut to form a section before or after the folding of the flaps one onto the other, the section forming the bag at the end of the operations,
- wherein a hem is formed on each edge of the first strip before folding and adhesive is applied to the hems at least over one length of the first or second flap on one seam face,
- the folding bringing for each edge hem against hem by the seam face in such a way as to obtain bonding of the hems to each other to bring the first and the second flaps together along the edges, and
- whereby a cheek is also formed on each edge of the first strip, the cheek being folded against the internal face and extending between the hem and a central part of the strip, in such a way that a stack is formed with, in the following order, the central part, the cheek and the hem, the cheeks forming a bellows linking the first and second flaps after bonding of the hems.

* * * * *